US007501930B2

(12) United States Patent
Cote et al.

(10) Patent No.: US 7,501,930 B2
(45) Date of Patent: Mar. 10, 2009

(54) LOCK CONTROL SYSTEM WITH LOCK-DOWN FEATURE

(75) Inventors: Michael Cote, Plainville, CT (US); George Frolov, Farmington, CT (US); Gary E. Lavelle, Avon, CT (US)

(73) Assignee: Harrow Products, Inc., Montvale, NJ (US)

( * ) Notice: Subject to any disclaimer, the term of this patent is extended or adjusted under 35 U.S.C. 154(b) by 781 days.

(21) Appl. No.: 11/060,453

(22) Filed: Feb. 17, 2005

(65) Prior Publication Data

US 2005/0179267 A1 Aug. 18, 2005

Related U.S. Application Data

(60) Provisional application No. 60/545,323, filed on Feb. 17, 2004.

(51) Int. Cl.
*G05B 23/00* (2006.01)

(52) U.S. Cl. ........................ 340/5.5; 340/5.81; 340/5.8; 340/5.3; 340/5.31; 340/5.33; 340/542; 340/541; 340/540

(58) Field of Classification Search ................ 340/5.81, 340/5.8, 5.3, 5.31, 5.33
See application file for complete search history.

(56) References Cited

U.S. PATENT DOCUMENTS

| | | | | | |
|---|---|---|---|---|---|
| 4,967,305 | A | * | 10/1990 | Murrer et al. | 361/172 |
| 5,056,835 | A | * | 10/1991 | Johnson | 292/207 |
| 5,062,670 | A | * | 11/1991 | Grossman | 292/137 |
| 5,608,298 | A | * | 3/1997 | Frolov et al. | 318/286 |

* cited by examiner

*Primary Examiner*—Brian A Zimmerman
*Assistant Examiner*—Vernal U Brown
(74) *Attorney, Agent, or Firm*—Michael Best & Friedrich LLP

(57) ABSTRACT

A control system is for a lock of a door movably disposed within a frame and having a latch engageable with the frame, an interior handle connected with the latch and an exterior handle connectable with the latch. A connective mechanism is configured to releasably connect the exterior handle with the latch and an input device is configured to generate an unlock signal. A controller is coupled with the input device and configured to operate the connective mechanism such that the mechanism connects the exterior handle with the latch. The controller is selectively operable in a standard mode where the controller operates the mechanism when the controller receives the unlock signal and a lockdown mode where the controller does not operate the mechanism when receiving the unlock signal. A lockdown-input device coupled with the controller is configured to generate a lock-down signal to switch the controller to the lockdown mode.

36 Claims, 10 Drawing Sheets

LOCK CONTROL SYSTEM WITH LOCK-DOWN FEATURE

This application claims priority to U.S. Provisional Application Ser. No. 60/545,323, filed Feb. 17, 2004, the entire contents of which are incorporated herein by reference.

BACKGROUND OF THE INVENTION

The present invention relates to lock systems, and more particularly to electronic controllers for lock systems.

A lock for a door generally includes a latchbolt or latch moveably disposed within a door and engageable with a frame to releasably secure the door therewithin. Typically, the door has interior and exterior handles that are each rotated, pushed or otherwise displaced so as to disengage the latch from the frame to enable the door to be opened. Often, such door locks are provided with a device for alternatively preventing and enabling disengagement of the latch from the frame, for example, by connecting or disconnecting one or both handles from the latch. Further, certain locks include electronic systems or mechanisms for releasably connecting the handles with the latch, for example by a motor-actuated clutch.

SUMMARY OF THE INVENTION

In one aspect, the present invention is a control system for a lock of a door movably disposed within a frame. The lock has a latch engageable with the frame to releasably secure the door to the frame and the door has an interior handle operatively connected with the latch and an exterior handle operatively connectable with the latch. The control system comprises a connective mechanism configured to releasably connect the exterior handle with the latch and an input device configured to generate an unlock signal. A controller is coupled with the input device and is configured to operate the connective mechanism such that the mechanism connects the exterior handle with the latch. The controller is selectively operable in a first, standard mode in which the controller operates the mechanism when the controller receives the unlock signal and a second, lockdown mode in which the controller does not operate the mechanism when the controller receives the unlock signal.

In another aspect, the present invention is a control system for a lock of a door movably disposed within a frame, the lock having a latch movably disposed within the door and engageable with the frame to releasably secure the door to the frame and at least one handle operatively connectable with the latch to displace the latch with respect to the door. The control system comprises a control mechanism configured to one of releasably connect the handle with the latch to permit disengagement of the latch from the frame and releasably retain at least one of the handle and the latch so as to prevent disengagement of the latch from the frame. An input device configured to generate an unlock signal and a controller is coupled with the input device and configured to operate the control mechanism. The controller is selectively operable in a first, standard mode in which the controller operates the mechanism when the controller receives the unlock signal so as to permit the latch to be disengaged from the frame and a second, lockdown mode in which the controller does not operate the mechanism when the controller receives the unlock signal.

In a further aspect, the present invention is also a control system for a lock of a door movably disposed within a frame. The lock has a latch engageable with the frame to releasably secure the door to the frame and the door has an interior handle operatively connected with the latch and an exterior handle operatively connected or connectable with the latch. The control system comprises a mechanism configured to either releasably connect the exterior handle with the latch or to releasably lock the exterior handle so as to prevent movement of the exterior handle with respect to the door. An input device configured to generate an input signal and a controller is coupled with the input device and configured to operate the connective mechanism such that the mechanism connects the exterior handle with the latch or unlocks the exterior handle to permit relative movement with respect to the door. The controller is selectively operable in a first, standard mode in which the controller operates the control mechanism when the controller receives the input signal and a second, lockdown mode in which the controller does not operate the control mechanism when the controller receives the input signal.

In yet another aspect, the present invention is again a control system for a lock of a door movably disposed within a frame. The lock has a latch engageable with the frame to releasably secure the door to the frame and the door has an interior handle operatively connected with the latch and an exterior handle operatively connectable with the latch. The control system comprises a mechanism configured to either releasably connect the exterior handle with the latch or to releasably lock the exterior handle so as to prevent movement of the exterior handle with respect to the door. An input device is configured to generate an input signal and the controller is coupled with the input device and configured to compare the signal to at least one stored signal value. The controller is further configured to operate the connective mechanism such that the mechanism connects the exterior handle with the latch or unlocks the exterior handle to permit relative movement with respect to the door. Further, the controller is selectively operable in a first, standard mode in which the controller operates the mechanism when the controller input signal matches the stored signal value and a second, lockdown mode in which the controller does not operate the mechanism when the input signal matches the stored signal value.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
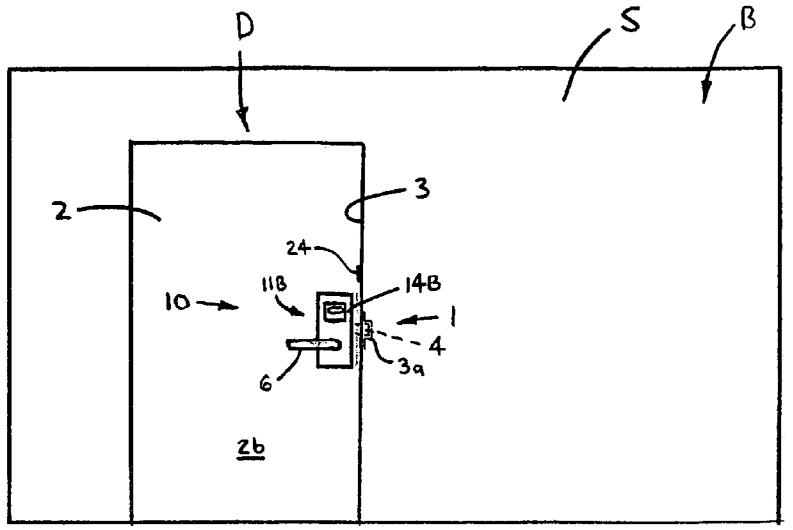
FIG. 1 is an elevational view of a doorway incorporating a lock control system in accordance with the present invention.
Figure 2:
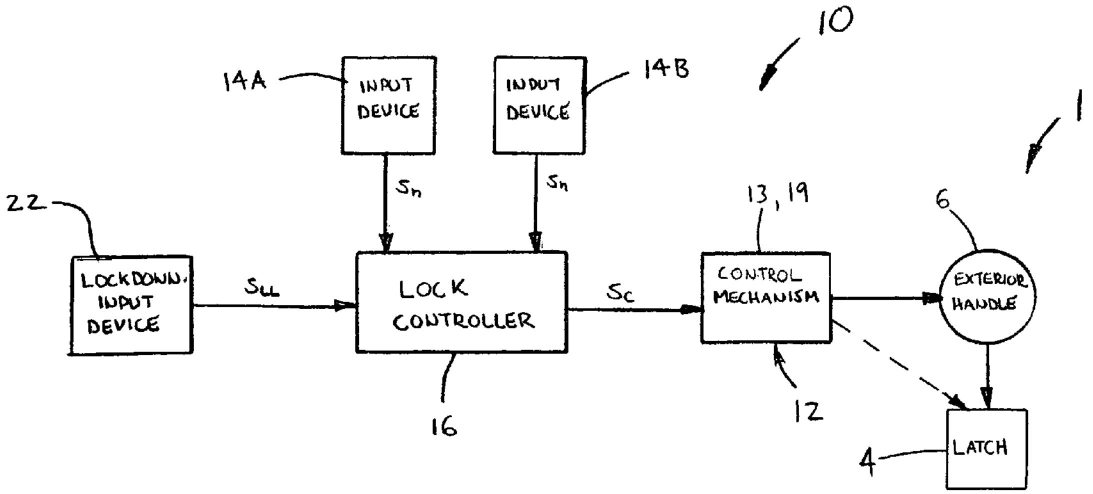
FIG. 2 is a block diagram of the basic lock control system.

Certain terminology is used in the following description for convenience only and is not limiting. The words "inner", "inwardly" and "outer", "outwardly" refer to directions toward and away from, respectively, a designated centerline or geometric center of an element being described, the particular meaning being readily apparent from the context of the description. As used herein, the word "connected" is intended to include direct connections between two members without any other members interposed therebetween and indirect connections between members in which one or more other members are interposed therebetween. Further, the term "position" is used herein to indicate a position, location, configuration, orientation, etc., of one or more components of a lock or lock control system and each is depicted in the drawings with reference to a randomly selected point on the item being described. Such points in the drawing figures are randomly selected for convenience only and have no particular relevance to the scope of the present invention. Additionally, as used herein, the term "latch" encompasses all moveable members, devices or assemblies having a portion/component engageable with a frame to secure a door therewithin, including spring-loaded latches retained in engagement with a frame by spring force, positively locking deadbolts retained in engagement with (or retracted from) a frame by a locking mechanism, and all other types of locking bars or similar devices. The terminology includes the words specifically mentioned above, derivatives thereof, and words of similar import.

Referring now to the drawings in detail, wherein like numbers are used to indicate like elements throughout, there is shown in FIGS. 1-14 a lock control system 10 in accordance with the present invention for controlling a lock 1 of a door 2 movably disposed within a frame 3 of a doorway D. The door 2 has interior and exterior sides 2*a*, 2*b* and the lock 1 includes a moveable latch 4 engageable with the frame 3 to releasably secure the door 2 therewithin and alternately retractable to enable the door 2 to displace with respect to the frame 3. The lock 1 also includes at least one handle, and preferably an interior handle 5 operatively connected with the latch 4 and an exterior handle 6 operatively connectable or connected with the latch 4. Basically, the control system 10 comprises an access control mechanism 12 configured to either releasably connect the exterior handle 6 with the latch 4 or to releasably retain the exterior handle 6 or/and the latch 4 (or another lock component) so as to prevent latch disengagement from the frame 3, at least one and preferably two input devices 14A, 14B each configured to generate an unlock signal, and a lock controller 16 configured to operate the control mechanism 12. Preferably, the access control mechanism 12 is a connective mechanism 13 adjustable between a first configuration in which the exterior handle 6 is operatively connected with the latch 4 and second configuration in which the exterior handle 6 is unconnected with the latch 4. However, the control mechanism 12 may alternatively be a retainer mechanism 19 (see FIG. 14) configured to releasably retain the exterior handle 6, or the latch 4, at a fixed position with respect to the door 2 so as to alternately prevent and permit disengagement of the latch 4 from the frame 3, as discussed below. Further, the two preferred input devices 14A, 14B are each disposed generally on a separate one of the door sides 2*a*, 2*b*, respectively; more specifically, one input device 14A is an interior input device and is disposed generally on the interior side 2*a* of the door 2 and the other input device 14B is an exterior input device and is disposed generally on the door exterior side 2*b*.

Figure 4:
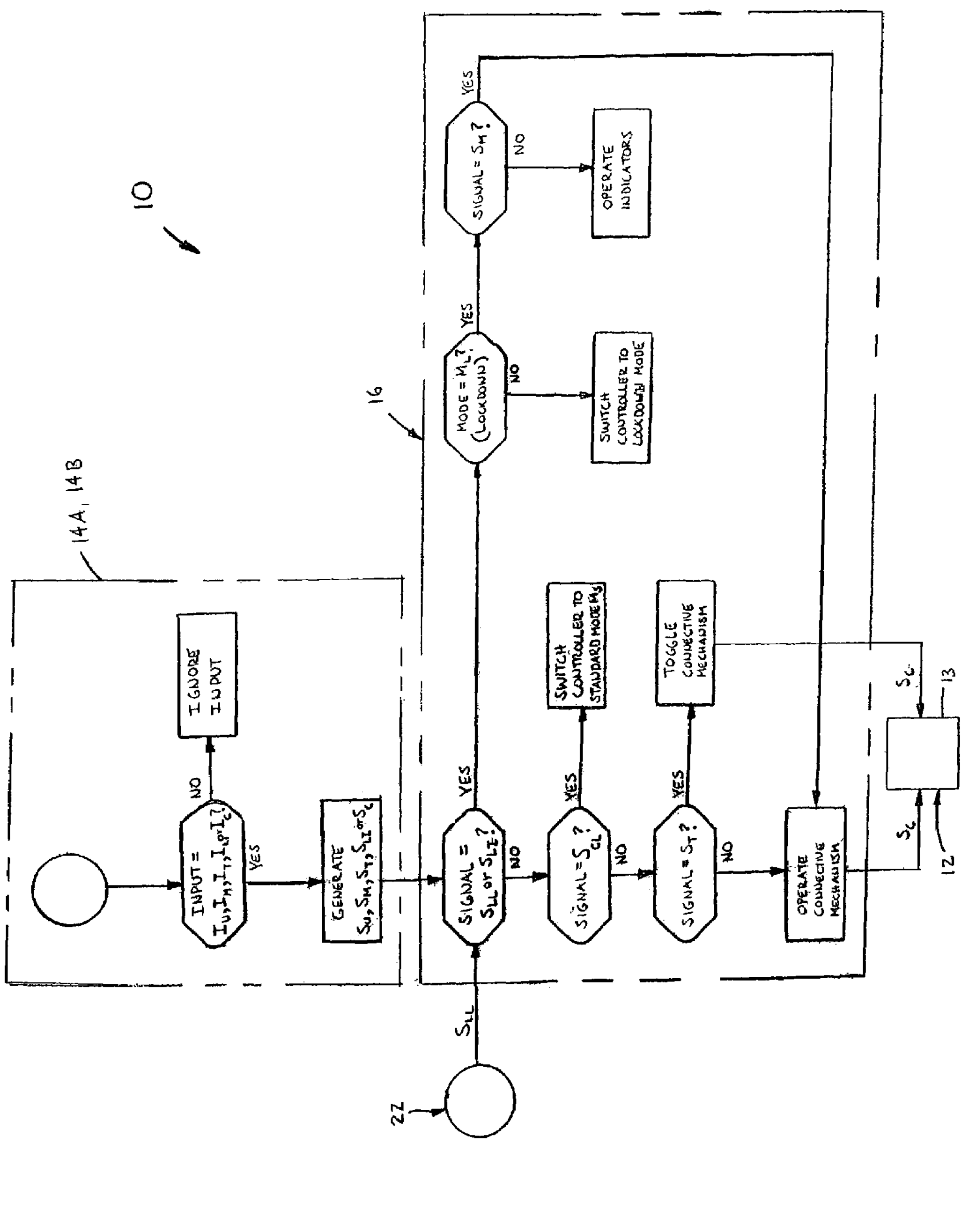
FIG. 4 is a logic flow diagram depicting the operation of the lock control system.

Furthermore, the lock controller 16 is coupled with the two input devices 14A, 14B and is configured, i.e., programmed or constructed (e.g., "hard-wired"), to operate the access control mechanism 12 such that the mechanism 12 connects the exterior handle 6 with the latch 4, or alternatively releases the handle 6 (or latch 4) to be displaceable with respect to the door 2, so that the latch 4 is disengageable from the frame 3, as discussed below. More specifically, the controller 16 is selectively operable in a first, standard mode $M_S$ in which the controller 16 operates the mechanism 12 when the controller 16 receives the unlock signal $S_U$ and a second, lockdown mode $M_L$ in which the controller 16 does not operate the mechanism 12 when the controller 16 receives the unlock signal $S_U$, as generally depicted in FIG. 4. As such, when the controller 16 is operating in the lockdown mode $M_L$, the ability to open the door 2 from the exterior side 2*b* is restricted to certain authorized users, as discussed below. However, as the interior handle 5 preferably remains constantly connected with the latch 4, or with a mechanism 12 that retains the latch 4 in a locked position (as discussed below), the door 2 is always "openable" from the interior side 2*a* so that egress from a building B through the doorway D is never prevented, i.e., for safety purposes. Furthermore, the controller 16 is also preferably configured to operate the connective mechanism 13 to disconnect the exterior handle 6 from the latch 4 upon the expiration of a predetermined time interval (e.g., 5 seconds) after the exterior handle 6 has been connected with the latch 4, except for when the exterior handle 6 has been connected in response to a "toggle" input $I_T$, as discussed below. Alternatively, the connective mechanism 13 itself may be configured to automatically disconnect the exterior handle 6 from the latch 4 upon the expiration of a predetermined time interval after the exterior handle 6 has been connected with the latch 4.

Additionally, the lock control system 10 preferably further comprises a lockdown-input device 22 is coupled with the controller 16 and is configured to generate a lockdown signal $S_{LL}$. The controller 16 is further configured to switch from the standard mode $M_S$ to the lockdown mode $M_L$ when the controller 16 has received the lockdown signal $S_{LL}$ from the lockdown device 22. Preferably, the controller 16 switches to the lockdown mode $M_L$ when the controller 16 has received both the lockdown signal $S_{LL}$ and one input signal $S_n$ from one of the input devices 14A, 14B, and most preferably when the controller 16 receives the lockdown signal $S_{LL}$ within a predetermined interval of time after the controller 16 has received the signal $S_n$ from the input device 14A or 14B. Further, the lockdown-input device 22 preferably includes a pushbutton 23 and is configured to generate the lockdown signal $S_{LL}$ when the pushbutton 23 is pushed or otherwise contacted or manipulated by a user, but may include any other appropriate input device (e.g., touchscreen, lever switch, etc.). Furthermore, the lock control system 10 preferably further comprises a switch 24 electrically coupled with the controller 16 and configured to sense displacement of the door 2 with respect to the frame 3, for reasons described below.

Figure 14:
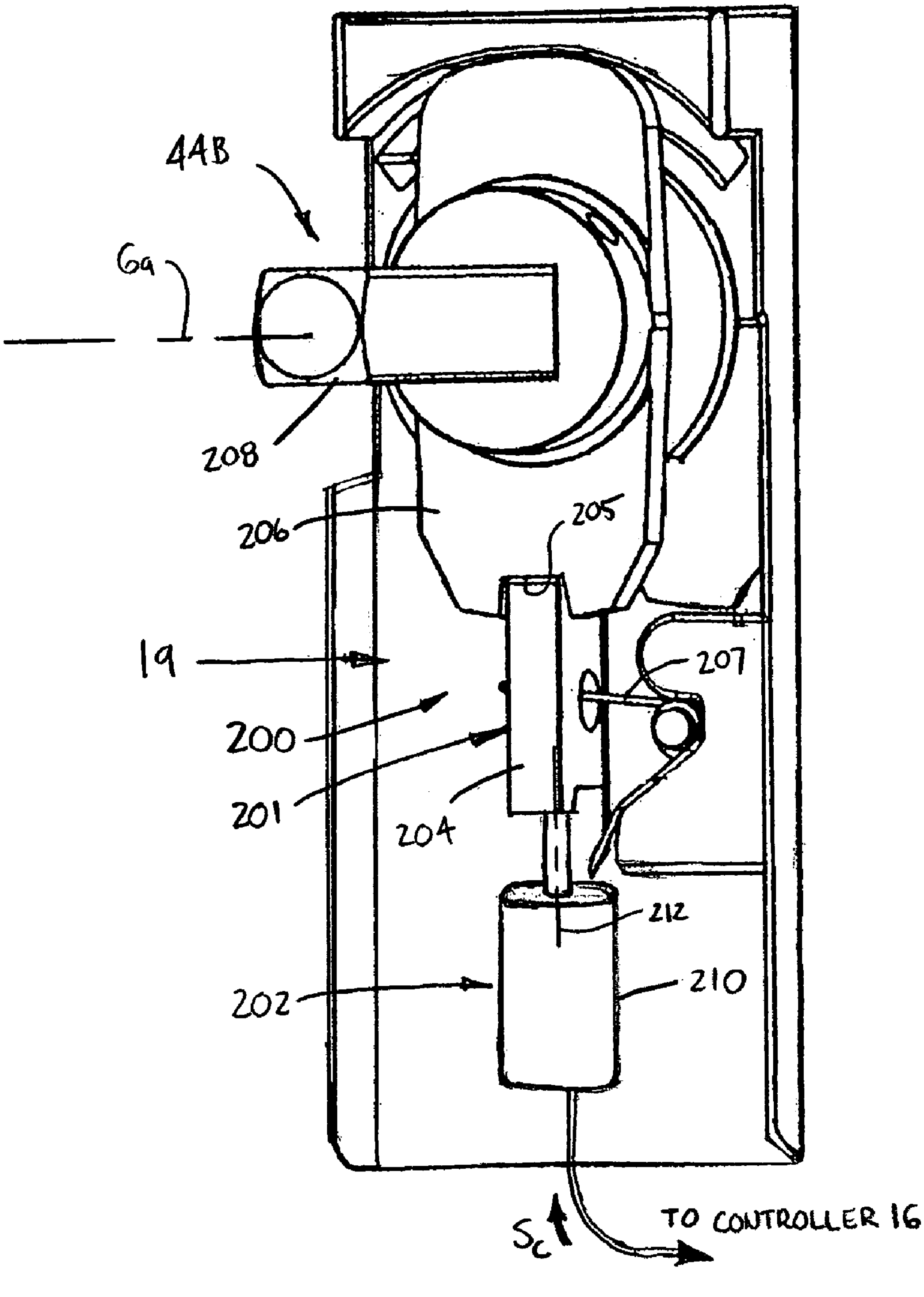
FIG. 14 is a broken-away, perspective view of an alternative lock assembly using the lock control system, which includes an exemplary retainer mechanism for releasably retaining a door handle.

Referring to FIGS. 9 and 11-13, the preferred connective mechanism 13 preferably includes a connective member 18 displaceable between first and second positions $C_1$, $C_2$, respectively, and an actuator 20 operably coupled with the controller 16 and operatively connected with the connective member 18. In the connective member first position $C_1$, (FIG. 13), the exterior handle 6 is operatively connected with the latch 4 (i.e., the mechanism first configuration) and in the second position $C_2$ (FIG. 12), the exterior handle 6 is unconnected with the latch 4 (i.e., the second configuration). The actuator 20 is configured to displace the connective member 18 between the first and second positions $C_1$, $C_2$ when the actuator 20 receives an appropriate control signal from the controller 16, as described in further detail below. Alternatively, as depicted in FIG. 14, the access control mechanism 12 may be formed as a retainer mechanism 19 configured to releasably retain or "lock" and alternately "unlock" the exterior handle 6, so as to prevent rotation or other movement of the handle 6, as mentioned above and discussed in detail below.

Referring now to FIGS. 2-8, each input device 14A, 14B is configured to generate at least one input signal $S_n$ when the input device 14A, 14B receives a predetermined or authorized input, the unlock signal $S_U$ being one of the input signals $S_n$. Preferably, the input devices 14A, 14B are each configured to generate the unlock signal $S_U$ when the particular input device 14A or 14B receives one of a plurality of predetermined, authorized user inputs $I_U$. Further, the input devices 14A, 14B are each configured to alternatively generate a master unlock signal $S_M$ when the input device 14A, 14B receives a predetermined "super user" or master-user input $I_M$, and most preferably generates the master unlock signal $S_M$ upon receipt of one of a plurality of predetermined master user inputs $I_M$. Additionally, each input device 14A, 14B is preferably further configured to generate a toggle signal $S_T$ upon receipt of a predetermined toggle input $I_T$, to generate an input lockdown signal $S_{LI}$ upon receipt of a predetermined lockdown input $I_L$, and to generate a lockdown-cancel signal $S_{CL}$ upon receipt of a predetermined lockdown cancel input $I_C$. As with the user input $I_U$ and master user input $I_M$, each toggle input $I_T$, lockdown input $I_L$ and lockdown cancel input $I_C$ is preferably one of a plurality of predetermined inputs $I_T$, $I_L$, $I_C$, respectively.

Figure 7:
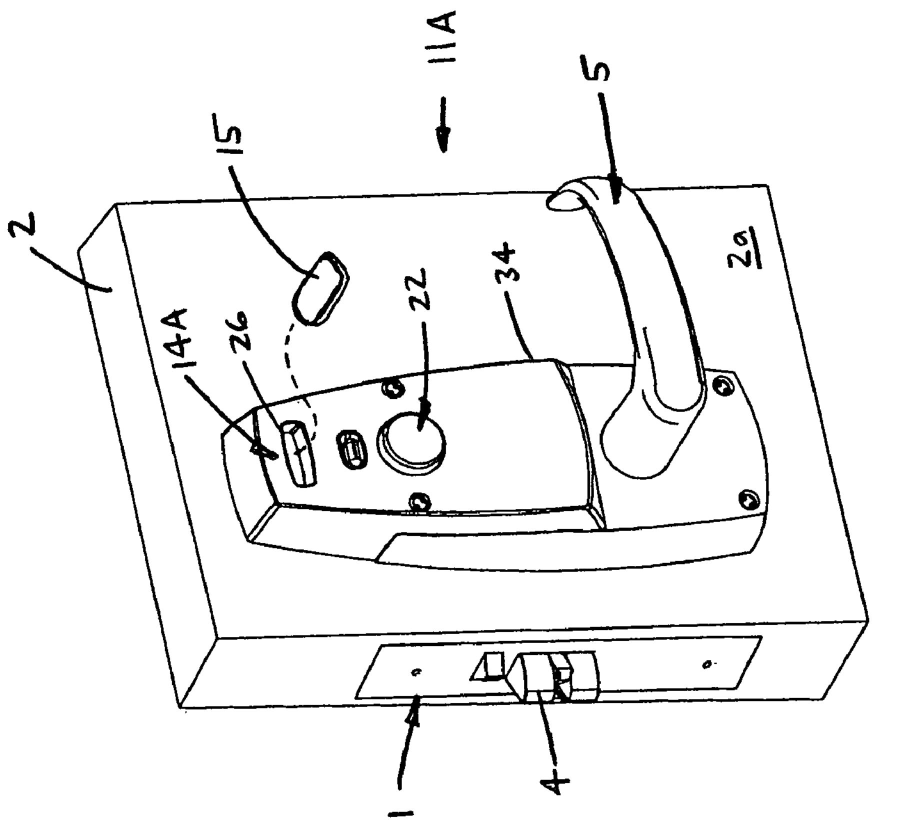
FIG. 7 is a perspective view of the interior control assembly, shown mounted on a door.
Figure 6:
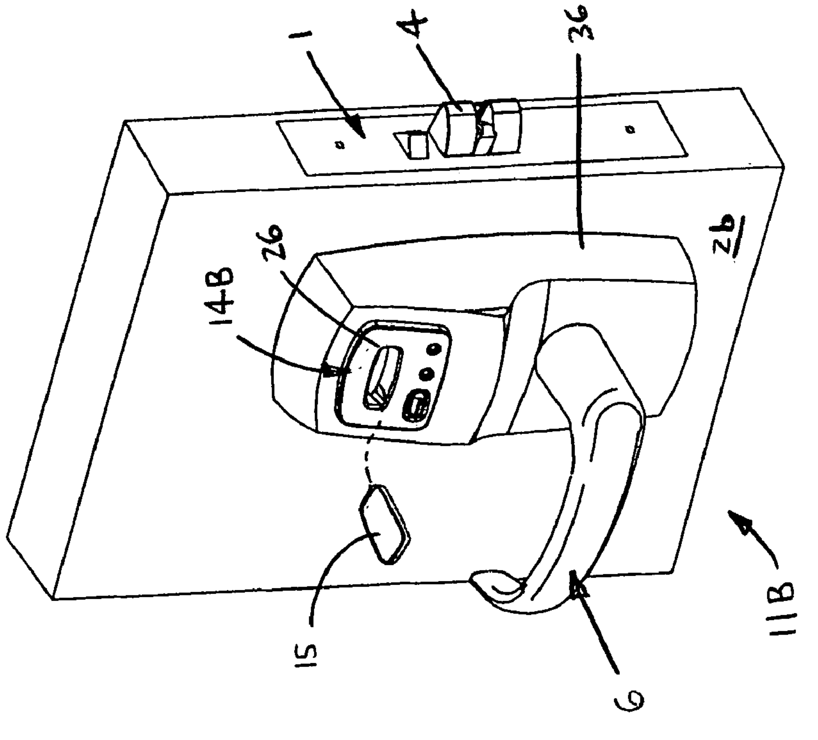
FIG. 6 is a perspective view of the exterior control assembly, shown mounted on a door.

Preferably, each input device 14A, 14B is preferably a card reader input device 26 and each of the above-described inputs $I_U$, $I_M$, $I_T$, $I_L$ or $I_C$ is provided by a code, such as a magnetic, electrical or optical (e.g., bar) code, disposed or contained on a separate fob, card or similar code-carrying device, hereinafter collectively referred to as a "card" 15 (FIGS. 6 and 7). Each card reader input device 26 includes a reader 27 configured to sense the card 15 and an input controller 28 operatively coupled with the reader 27. The reader 27 is configured to either sense the input code on the card 15 and to transmit the code to the input controller 28 or to "power" the card 15 such that the card 15 directly transmits (e.g., by wireless transmission) the code to the input controller 28. The input controller 28 is preferably configured to compare the input code to a plurality of stored code values and when the input code matches one of the stored code values, to generate the appropriate unlock signal $S_U$ or $S_M$, toggle signal $S_T$, or lockdown signal $S_{LI}$. The input controller 28 then transmits such signal to the lock controller 16, as discussed below. When a single microprocessor 17 provides the two controllers 16, 28, as described below, the signals $S_U$, $S_M$, $S_T$, and $S_L$ are each the output of one program or subprogram that analyzes the input (i.e., the input controller 28), which is sent to another program/subprogram that operates the access control mechanism 12 (i.e., the lock controller 16). Alternatively, either of the input devices 14A, 14B may be any other appropriate type of input device configured to receive any appropriate input and generate a signal, such as for example, an electronic keypad.

As generally indicated in FIG. 4, the lock controller 16 is preferably further configured to operate the connective mechanism 13, so as to connect the exterior handle 6 with the latch 4, when the controller 16 receives the master unlock signal $S_M$ in either the standard mode $M_S$ or in the lockdown mode $M_L$. As such, the master user input $I_M$ enables the door 2 to be opened from the exterior side 2*b* even when the controller 16 is in the lockdown mode $M_L$. The controller 16 is also configured to switch from the lockdown mode $M_L$ back to the standard mode $M_S$ when the door 2 is displaced with respect to the frame 3. However, when the controller 16 is operating in the lockdown mode $M_L$, receipt of the lockdown signal $S_{LL}$ or $S_{LI}$ within a predetermined time interval subsequent to displacement of the door 2 after the controller 16 has received the master unlock signal $S_M$ causes the controller 16 to remain in the lockdown mode $M_L$. In other words, when the controller 16 causes the exterior handle 6 to be connected with the latch 4 in response to the master-unlock signal $S_M$, the lockdown mode $M_L$ will not be canceled after the door 3 is opened if the controller 16 again receives a lockdown signal $S_{LL}$ or $S_{LI}$ from the lockdown input device 22 or from one of the input devices 14A, 14B, respectively, within the time interval. Further, the controller 16 is preferably also configured to switch from the standard mode $M_S$ to the lockdown mode $M_L$ when the controller 16 receives the lockdown signal $S_{LI}$ from one of the input devices 14A or 14B. Alternatively, the controller 16 switches from the lockdown mode $M_L$ to the standard mode $M_S$ upon receipt of the lockdown-cancel signal $S_{CL}$ from one of the input devices 14A, 14B.

Additionally, the controller 16 is preferably further configured to operate the connective mechanism 13 when the controller 16 receives the toggle signal $S_T$ while in the standard mode $M_S$ such that the exterior handle 6 is connected with the latch 4 or is alternatively unconnected or disconnected from the latch 4. In other words, the connective mechanism 13 is adjusted to the second configuration, preferably by displacing the moveable member 18 to the second position $C_2$, when the controller 16 receives the toggle signal $S_T$ with the mechanism 12 arranged in the first configuration. Alternatively, the connective mechanism 13 is adjusted to the first configuration when the controller 16 receives the toggle signal $S_T$ with the mechanism 12 arranged in the second configuration. Thus, the toggle signal $S_T$ causes the exterior handle 6 to be either connected with or disconnected from the latch 4, and to remain so connected or disconnected until the controller 16 receives another command signal from one of the input devices 14A, 14B. However, the controller 16 is also configured such that the controller 16 does not operate the connective mechanism 13 when the controller 16 receives the toggle signal $S_T$ while in the lockdown mode $M_L$.

Figure 3:
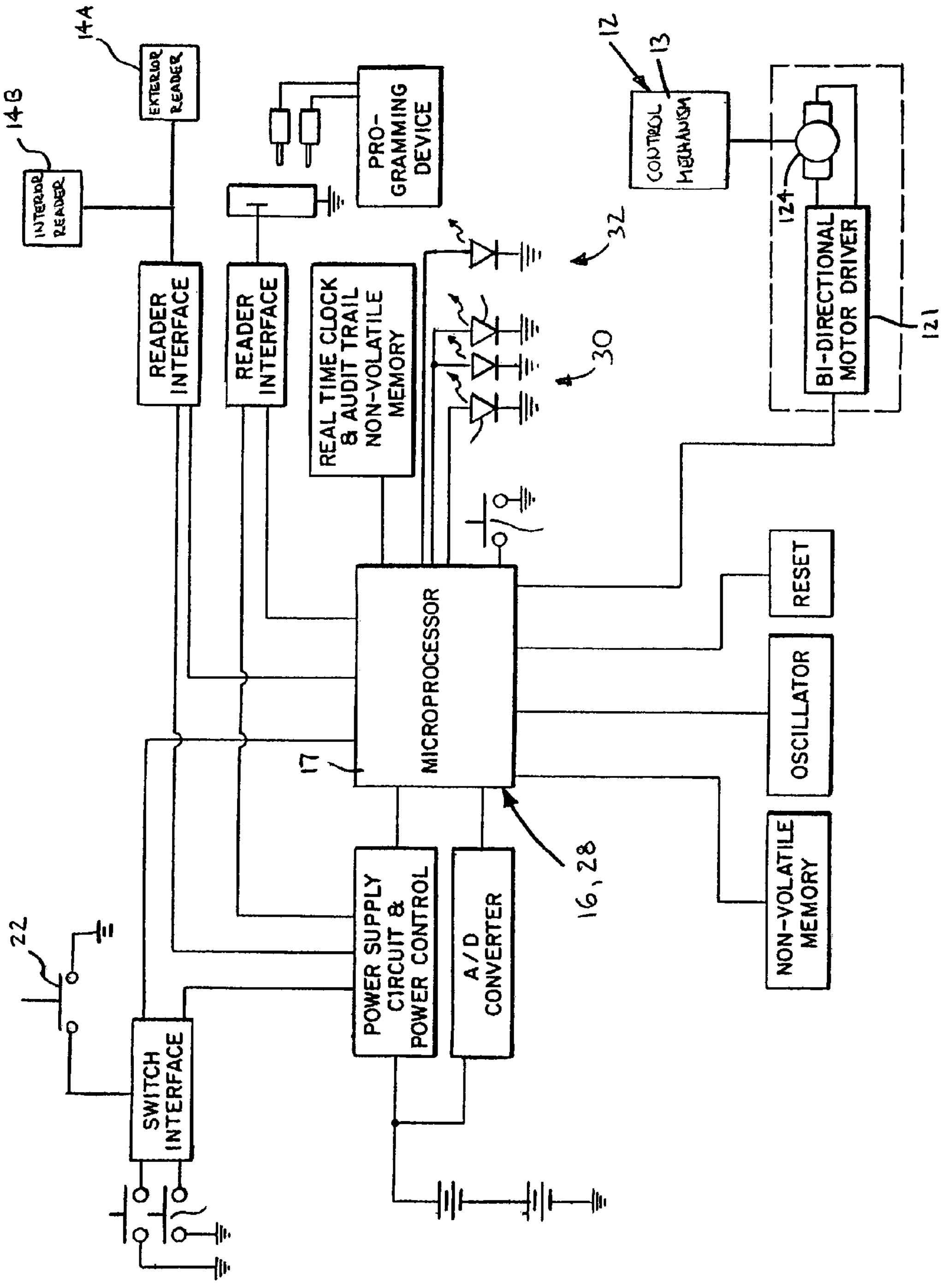
FIG. 3 is a schematic diagram of electrical components of the lock control system.
Figure 8:
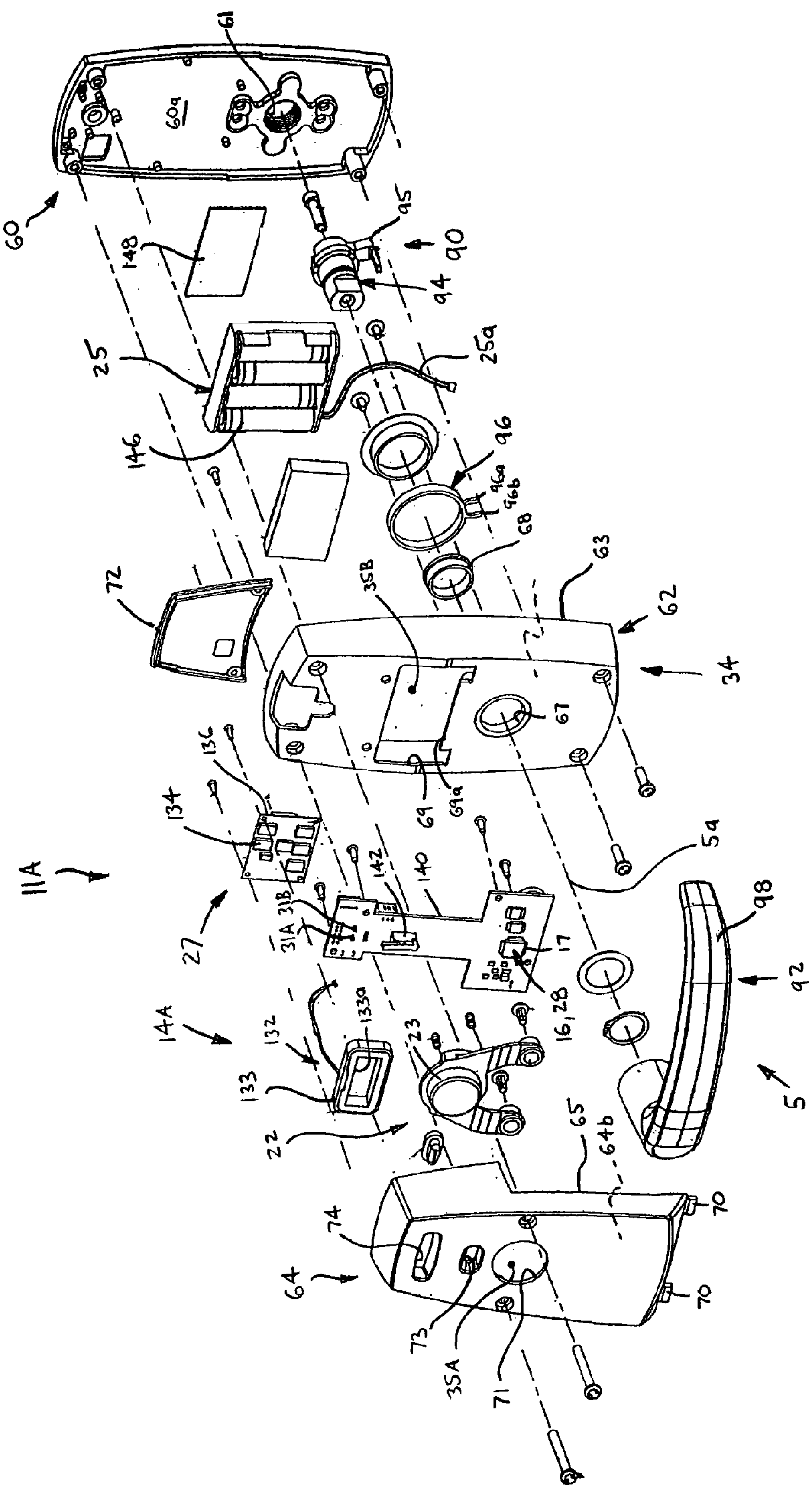
FIG. 8 is an exploded view of the interior control assembly.

Referring to FIGS. 3 and 8, the lock controller 16 preferably includes a microprocessor 17 with a programmable memory and one or more software programs installed in the memory. As such, the commands contained within the software program(s) enable the controller 16 to execute the various functions discussed above and in further detail below. Alternatively, the controller 16 may be constructed as an analog electrical logic circuit that is "hard wired" to execute the various controller functions or may be constructed as any other appropriate type of logic device capable of functioning generally as described herein. Further, the microprocessor 17 also preferably provides the input controller 28 and includes a separate sector of programmable memory configured to store a plurality of authorized code values. The microprocessor 17 is further configured to compare each input code from a card 15 with the stored code values and to generate the appropriate signals when the input code matches a stored code value. Although the lock controller 16 and the input controller 28 are preferably provided by the single microprocessor 17, respectively, the two controllers 16, 28 may alternatively be provided by two separate microprocessors, by one or more computers, or any other types electronic logic circuit(s) configured to perform all the functions of the lock and input controllers 16, 28, respectively, as described above.

Further, the lock control system 10 also preferably includes at least one interior indicator 30 disposed generally on the interior side 2*a* of the door 2 and at least one exterior indicator 32 disposed on the door exterior side 2*b*. Each of the indicators 30, 32 is electrically connected with the lock controller 16 and is configured to display an indication (e.g., illuminate, display text message, etc.) when the controller 16 is in the standard mode $M_S$ and to display another indication when the controller 16 is in the lockdown mode $M_L$. Preferably, the interior indicator includes two lamps 31A, 31B each disposed generally on the door interior side 2*a* and the exterior indicator 32 includes two lamps 33A, 33B each disposed generally on the door exterior side 2*b*, each lamp 31A, 31B, 33A, 33B most preferably being a light-emitting diode ("LED"). Further, one lamp 31A, 33A on each side 2*a*, 2*b*, respectively, is preferably configured to provide light of a first color (e.g., green) and the other lamp 31B, 33B is configured to provide light of a second color (e.g., red). With this arrangement, the controller 16 is configured to illuminate the first color indicators 31A, 33A when the controller 16 is in the standard mode $M_S$ and the second color indicators 31B, 33B when the controller 16 is in the lockdown mode $M_L$. Further, the controller 16 is also preferably configured to illuminate the first color lamps 31A, 33A, and most preferably "flash" the indicator a specified number of times (e.g., five), whenever one of the authorized inputs $I_U$, $I_M$, $I_T$ and $I_L$ is presented during the controller standard mode $M_S$ and to alternatively illuminate (and preferably "flash") the second color lamps 31B, 33B when an authorized inputs $I_U$, $I_M$, $I_S$ or $I_L$ is presented during the lockdown mode $M_L$. Furthermore, the controller 16 is configured to illuminate (and preferably "flash") the second color interior lamp 31B when the lockdown-input device 22 is pushed or otherwise activated when the controller 16 is operating in the lockdown mode $M_L$.

Referring to FIGS. 5-9, the lock control system 10 is preferably arranged or organized into two control assemblies 11A, 11B, specifically, an interior control assembly 11A generally disposed on the door interior side 2*a* and an exterior control assembly 11B disposed generally on the door exterior side 2*b*. The interior control assembly 11A includes the interior handle 5, the interior input device 14A, the controller 16 and the lock-down input device 22, and preferably further includes a power supply 25, each component being connected with or/and disposed within a housing 34. The exterior control assembly 11B includes the exterior handle 6, the exterior input device 14B and the connective mechanism 13, each connected with or/and disposed within a housing 36. Each housing 34, 36 is preferably removably mountable to the interior and exterior door surfaces, respectively, so as to locate the associated components generally proximal to the lock 1, as described in further detail below. Alternatively, the individual lock system components may be separately attached or mounted to the door 2 at appropriate locations (not shown).

Preferably, the lock control system 10 is used as part of a "Safe School" system that includes one lock control system 10 installed on each door 2 of a school building S (FIG. 1). By providing the lock control systems 10, the school building S may be placed in a "lockdown" condition by switching the lock controller 16 of each door 2 to the lockdown mode $M_L$, thereby substantially limiting the ability of entry into the building or into individual rooms thereof. Such a lockdown condition may be desirable when an emergency situation occurs within the school building S, such as for example, gang violence or a riot within the school. With such a Safe School system, teachers or other faculty members may each be provided with a card 15 having a separate one of a plurality of authorized user inputs I or toggle inputs $U_T$ that enable such persons to "unlock" a door 2, and thus permit entry from the exterior side 2*b*, only when the controller 16 is operating in the standard mode $M_S$. School administrators and/or emergency personnel (e.g., police) may be each be provided with a card 15 that contains one of a plurality of predetermined master user inputs $I_M$, i.e., master user codes, such that these personnel may unlock a door 2 even when the lock controller(s) 16 are operating in the lockdown mode. However, the lock control system 10 may be used with a commercial office building, a government office complex, or any other application where it may be beneficial to restrict access to, but allow free egress from, a building B during an emergency or similar event.

Having discussed the basic elements and functions above, each of these and other components and aspects of the lock control system 10 of the present invention are described in further detail below.

Figure 5:
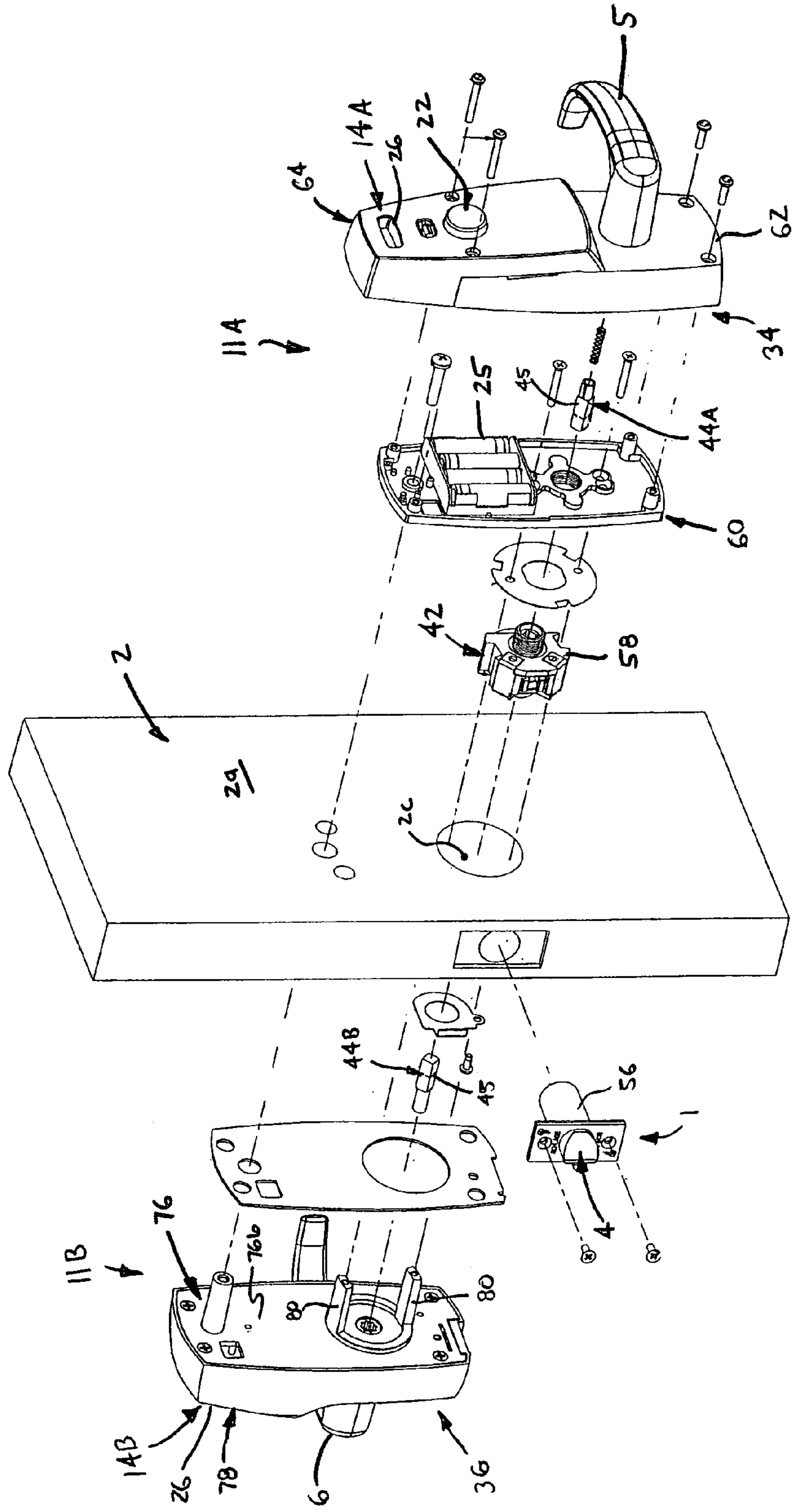
FIG. 5 is a partly exploded view of the lock control system, depicting preferred exterior and interior control assemblies.
Figure 10:
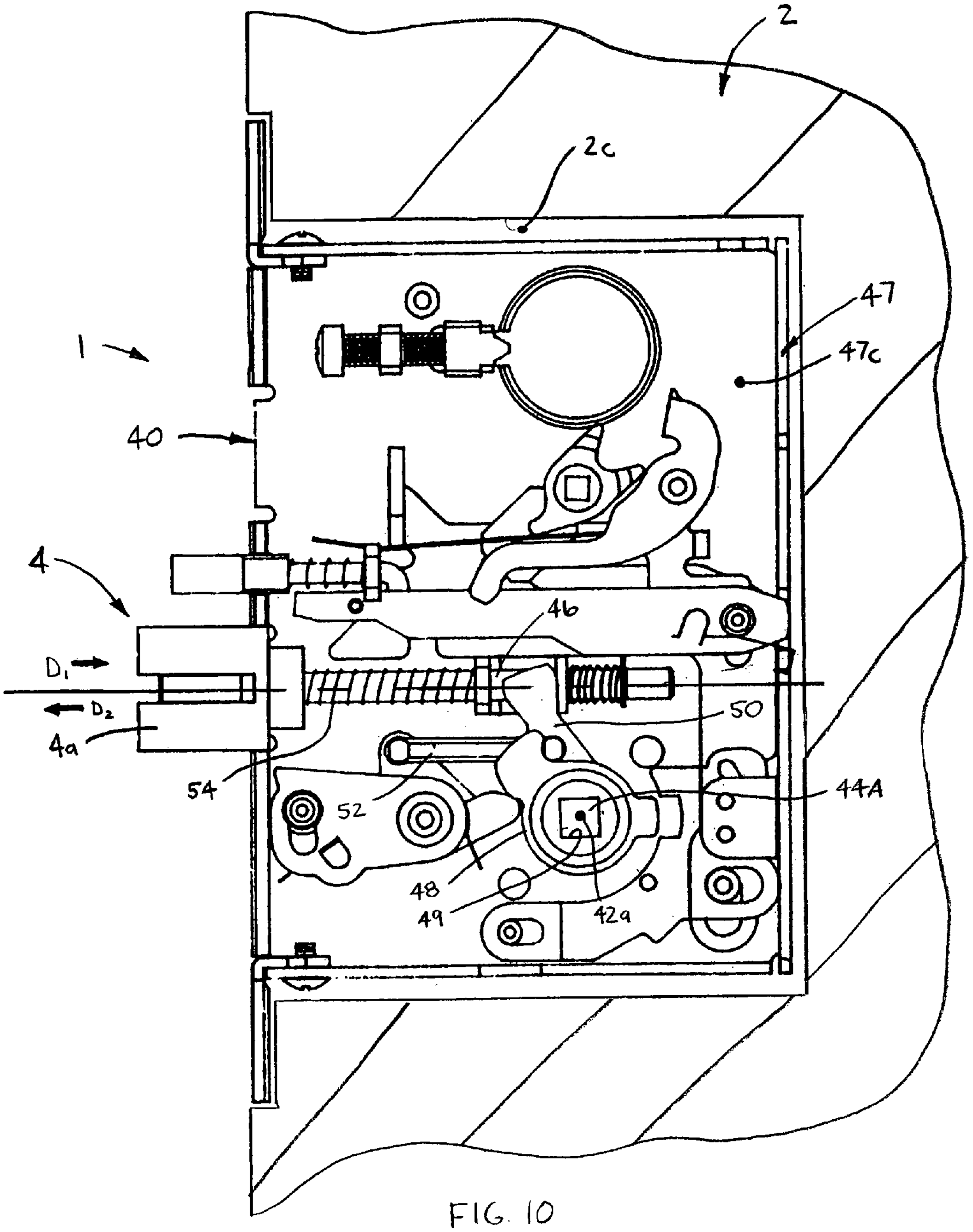
FIG. 10 is a side plan view of a preferred lock assembly.
Figure 13:
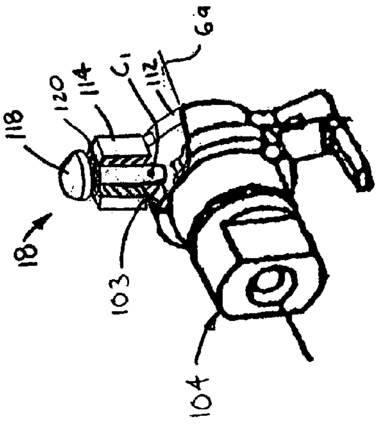
FIG. 13 is a greatly enlarged, partly broken-away view of the connective member shown in a second position and engaged with a spindle of an exterior handle.

Referring first to FIGS. 5, 6 and 10, each lock 1 is preferably a generally conventional mortise lock 40 of known construction, such that a detailed description of the lock 1 is beyond the scope of the present disclosure. However, certain details if the preferred mortise lock 40 are described below to provide a better understanding of the lock control system 10 of the present invention, as follows. The preferred mortise lock 40 further includes a retractor 42 configured to linearly displace the latch 4, at least one and preferably two spindles 44A, 44B connected with the retractor 42, and a housing 46. The latch 4 includes an outer portion 4*a* engageable with a strike 3*a* (FIG. 1) on the frame 3 and an inner portion 4*b*. The two spindles 44A, 44B are each formed as a generally rectangular bar 45, one spindle 44A being connected with the interior handle 5 and the other spindle 44B being connectable with the exterior handle 6, as described below. Further, the retractor 42 is pivotable about an axis 42*a* and is configured to displace the latch 4 between a first position in which the latch 4 is engaged with the frame 3 and a second position in which the latch 4 is disengaged from the frame 3. Preferably, the retractor 42 includes two pivotable hubs 48 (only one shown), a pivotable lever 50 engaged with the latch inner end 4*b*, and a link 52 connecting the two hubs 48 with the lever 50. Each hub 48 has a rectangular opening 49 sized to receive a portion of a separate one of the two spindles 44A, 44B, respectively.

With such a structure, when one of the spindles 44A, 44B is rotated by the associated handle 5, 6, respectively, the connected retractor hub 48 pivots and displaces the link 52, causing the attached lever 50 to pivot. As the lever 50 pivots, the lever 50 pushes the latch 4 to displace in a direction $D_1$ from the first position and toward the second position, thereby disengaging the latch 4 from the frame strike 3*a* and enabling the door 2 to be displaced with respect to the frame 3, i.e., "opened". Further, the lock 1 also preferably includes a coil spring 54 disposed about the latch inner portion 4*b* and configured to bias the latch 4 in a direction $D_2$ away from the second position and toward the first position (as shown). Furthermore, the housing 46 is preferably a generally rectangular box 47 sized to fit within a corresponding pocket 2*c* in the door 2 and having an interior chamber 47*a* into which the above-described lock components are assembled. Alternatively, the lock 1 may include a cylindrical latch 56 and a pivotable retractor 58, as shown in FIG. 5, and it is within the scope of the present invention to use the lock control system 10 with any other appropriate type of lock 1.

Referring now to FIGS. 5 and 8, the housing 34 of the interior lock control assembly 11A is preferably formed as a generally rectangular hollow box that includes upper and lower interior chambers 35A, 35B for containing at least portions of the various components of the interior control assembly 11A, as discussed above and in further detail below. Preferably, housing 34 includes a base plate 60, a lower shell member 62 attached to the base plate 60 so as to bound the lower chamber 35A, and an upper shell member 64 attached to the lower shell member 62 so as to bound the upper chamber 35A. The base plate 60 is generally rectangular and has a circular opening 61 and a mounting surface 60*a* spaced above the opening 61. The opening 61 is sized to receive a portion of either the interior handle 5 or of the retractor 42, such that the handle 5 is connected with the lock 1 through the base opening 61. The preferred power supply 25 is attached to the mounting surface 60*a* by means of an adhesive pad 148, as discussed below.

Further, the lower shell member 62 is generally rectangular shaped and has an open end 63 disposed against the base plate 60, the shell member 62 preferably being removably attached to the plate 60 by appropriate means (e.g., threaded fasteners). The lower shell member 62 further has a circular opening 67 and a generally rectangular aperture 69 spaced above the opening 63. The circular opening 67 is sized to receive an annular bushing 68 for rotatably supporting a portion of the interior handle 5 and a retainer tab (not shown) extending from the shell inner surface proximal to the opening 67 is provided to fixedly retain one end of a return spring 96, as described below. Further, the rectangular aperture 69 is has a lower edge 69*a* configured to receive a lower edge 64*a* of the upper shell member 64, such that the upper shell edge 64*a* is retained thereon by a pair of tabs 70. The rectangular aperture 69 also provides clearance for a power supply cord 25*a* and access to the power supply 25. Furthermore, the upper shell member 64 is generally rectangular shaped and has an open end 65, a lower portion of which is disposed against the lower shell member 62 and an upper portion being enclosed by an attached cover plate 72. The upper shell member 64 further includes a circular opening 71 sized to receive a portion of the preferred lockdown input device 22, an indicator aperture 73 and a generally ovular input aperture 74 sized to receive a portion of one of the preferred input cards 28, as discussed in further detail below. In addition, the upper shell member 64 also includes a plurality of attachment posts (not shown) formed on the shell inner surface 64*b* and configured for attachment of the preferred controller 16, interior input device 14A and lockdown-input device 22, as discussed below, such that these components are contained within the housing upper chamber 35A.

Figure 9:
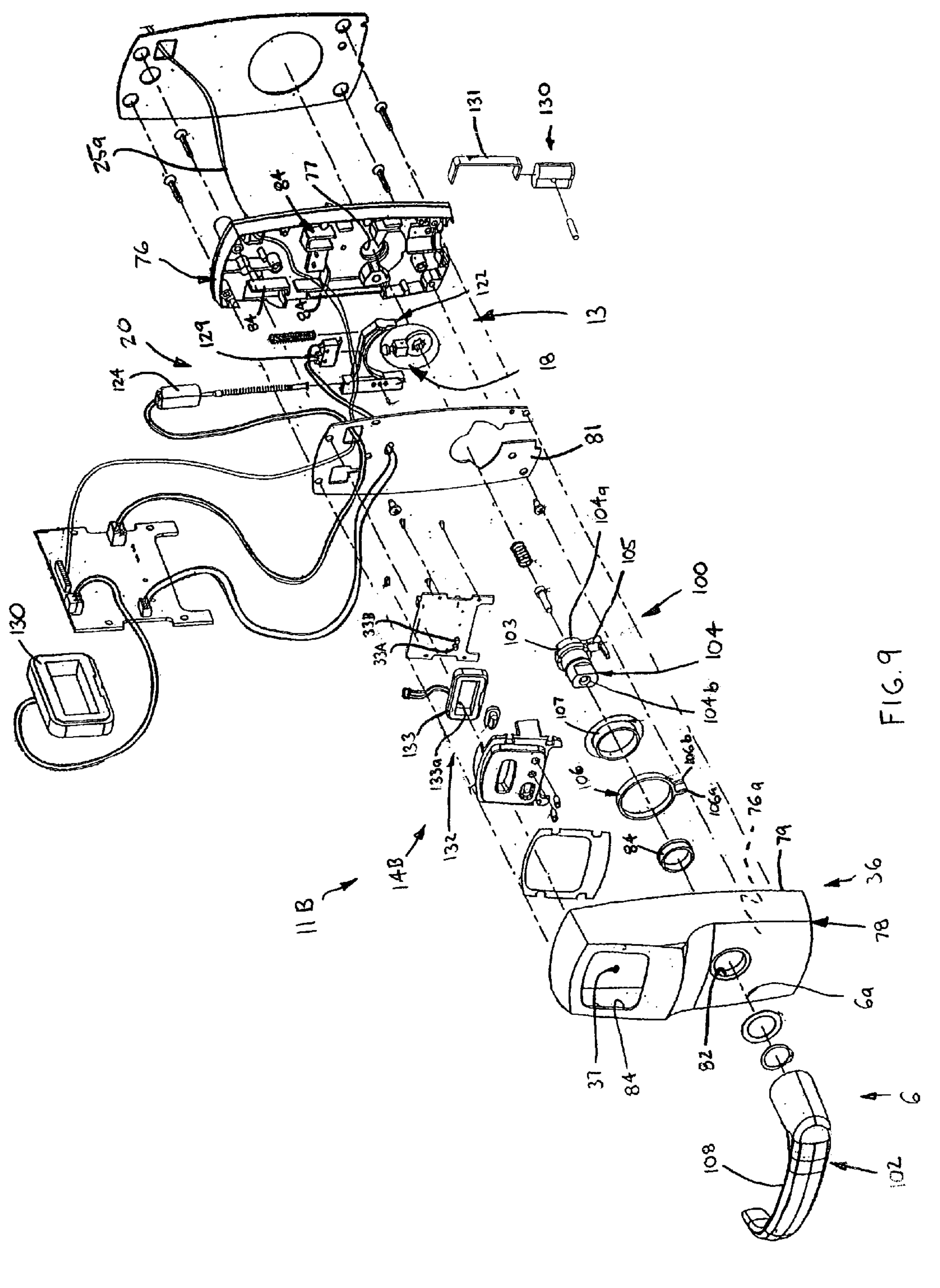
FIG. 9 is an exploded view of the exterior control assembly.

Referring to FIGS. 5 and 9, the housing 36 of the exterior lock control assembly 11B is preferably formed as a generally rectangular hollow box that includes an interior chamber 37 for containing at least portions of the various components of the exterior control assembly 11A, as discussed above and in further detail below. Preferably, the housing 36 basically includes a base plate 76 and a shell member 78 attached to the base plate 76 so as to bound the interior chamber 37 therebetween. The base plate 76 is generally rectangular and has opposing inner and outer surfaces 76*a*, 76*b*, respectively, and a circular opening 77 extending between the surfaces 76*a* and 76*b*. The lock exterior spindle 44B extends through the opening 77 so as to engage with the connective mechanism 13, as described below. A pair of connective arms 80 (FIG. 5) extend from the outer surface 76*b*, are disposeable within the door pocket 2*c* and are attachable to the interior housing base wall 60 so as to connect the two assemblies 11A, 11B. Further, a plurality of structural walls 84 extend from the base inner surface 76*a* and are configured to mount or guide various components of the connective mechanism 13, as described below. Furthermore, the shell member 78 has an open end 79 disposed against the base plate 76, the shell member 78 preferably being removably attached to the plate 76 by appropriate means (e.g., threaded fasteners). The shell member 78 further has a circular opening 82 and a generally rectangular aperture 84 spaced above the opening 82. The circular opening 82 is sized to receive an annular bushing 84 for rotatably supporting a portion of the exterior handle 6, and a retainer tab (not shown) extending from the shell inner surface 76*a* proximal to the opening 82 is provided to fixedly retain one end 106*a* of a return spring 106, as described below. Furthermore, the rectangular aperture 84 is sized to provide access to the exterior input device 14B, as discussed below. In addition, the exterior housing 36 also preferably includes a cover plate 81 disposed between the base plate 76 and the shell member 78 and configured to retain components of the preferred connective mechanism 13 disposed against the base plate 76, as described below.

Referring to FIG. 8, the interior handle 5 is preferably rotatable about an axis 5*a* and preferably includes an inner portion 90 connected with the latch 2 and an outer portion 92 manipulable by a user. As such, rotational displacement of the handle outer portion 92 displaces the latch 4 between the first and second latch positions. The handle inner portion 90 is preferably formed as a generally cylindrical hub 94 having a central longitudinal bore (not shown) and a return arm 95. The hub bore is sized to receive a portion of the interior spindle 44A of the lock 1, so as to connect the handle 5 with the retractor 42 and thereby with the latch 4. A torsion spring 96 is preferably connected with the return arm 95 and is arranged to bias the hub 94, and thus the entire handle 5, toward an initial position with respect to the axis 5*a*. Further, the handle outer portion 92 is preferably formed as a bended lever 98 attached to the hub 94 by appropriate means (e.g., a threaded fastener), such that lever 98 and hub 94 are rotatable about the axis 5*a* as single unit. Alternatively, the handle outer portion 92 may be formed in another appropriate manner, such as a knob, and/or the inner and outer portions 90 and 92 may be integrally formed such that the handle 5 is of one piece-construction. As a further alternative, the interior handle 5 may be constructed as a push bar or other linearly displaceable handle device (none shown) connected with the lock 1 in any appropriate manner such that displacement of the handle 5 displaces the latch 4 between the engaged and nonengaged positions.

Referring to FIG. 9, the exterior handle 6 is preferably rotatable about an axis 6*a* extending through the preferred assembly housing 36 when assembled therein, the axis 6*a* being collinear with the retractor axis 42*a* when the exterior assembly 11B is mounted to the door 2. Preferably, the exterior handle 6 includes an inner portion 100 engageable by the connective mechanism 13 and an outer portion 102 manipulable by a user. As such, when the connective mechanism 13 connects the exterior handle 5 with the latch 4, rotational displacement of the handle outer portion 102 displaces the latch 4 between the first and second latch positions. The handle inner portion 100 is preferably formed as a generally cylindrical hub 104 disposed within the housing interior chamber 37 and having an inner end 104*a* and an outer end 104*b* generally disposed within the handle opening 82 of the housing 36. The hub 104 has a central longitudinal bore (not shown), a radially-extending engagement opening 103, and a return arm 105. The hub bore is sized to receive a portion of the exterior spindle 44B of the lock 1, so as to connect the handle 6 with the retractor 42 and thereby with the latch 4. The engagement opening 103 is preferably formed as an axial slot extending into the hub 105 and sized to receive a portion of the connective member 18, as described below. Further, a generally annular torsion spring 106 has a pair of ends 106*a*, 106*b* and is disposed on a circular collar 107 connected with the shell inner surface 76*a* and disposed about the hub 104, one end 106 a being connected with the shell 76 and the other end 106*a* connected with the return arm 105. As such, the spring 106 is arranged to bias the hub 104, and thus the entire handle 6, toward an initial position with respect to the axis 6*a*. Furthermore, the handle outer portion 102 is preferably disposed externally of the housing 36 and is preferably formed as a bended lever 108 attached to the hub 104 by appropriate means (e.g., a threaded fastener), such that lever 108 and hub 104 are rotatable about the axis 6*a* as a single unit. Alternatively, the handle outer portion 102 may be formed in another appropriate manner, such as a knob, and/or the inner and outer portions 100 and 102 may be integrally formed such that the handle 6 is of one piece-construction.

Figure 11:
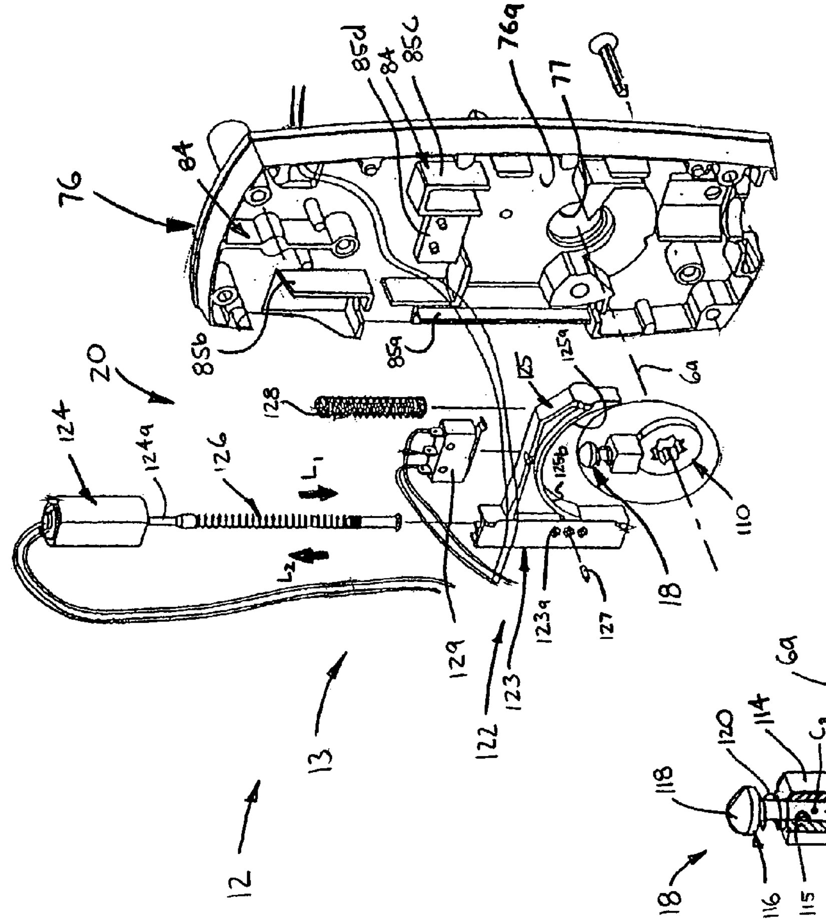
FIG. 11 is an enlarged, exploded view of a connective assembly of the lock control system.
Figure 12:
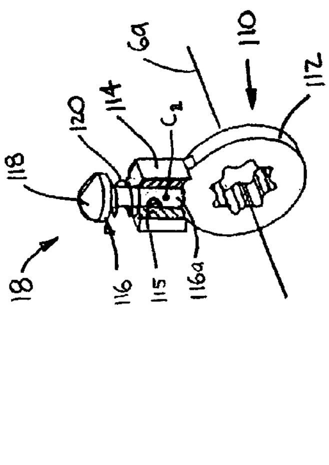
FIG. 12 is a greatly enlarged, partly broken-away view of a connective member, shown in a first position, and a coupler member of the connective mechanism.

Referring now to FIGS. 9, 11 and 12, the connective mechanism 13 is disposed within the exterior housing chamber 37 such that the various connective member components are mounted or disposed on the base plate inner surface 76*a*. The connective mechanism 13 preferably further includes a coupler member 110 located on the exterior handle axis 6*a* so as to be disposed or "sandwiched" generally between the inner end 104*a* of the exterior handle hub 104 and the base plate inner surface 76*a*. The coupler member 110 preferably includes a generally circular plate 112 and a generally rectangular bearing block 114 attached to the plate 112. The plate 112 has a central engagement opening 113 that is generally axially aligned with the housing opening 77, such that the exterior spindle 44B extends through the housing opening 77 and engages the coupler opening 113, preferably with a friction fit, so as to connect the coupler member 110 with the latch 4. The bearing block 114 has a radially-extending opening 115 sized to receive a portion of the connective member 18 such that the member 18 is slidably displaceable in radial directions with respect to the exterior handle axis 6*a*. Further, the connective member 18 preferably includes a bar or pin 116 disposed within the bearing opening 115 and a head 118. The pin 116 has an inner end 116*a* disposeable within the hub engagement opening 103 when the connective member 18 is located at the first position $C_1$ (FIG. 13), so as to connect the hub 104 with the spindle 44B, as discussed in further detail below. Further, a compression coil spring 120 is disposed about the pin 116 and extends between the bearing block 114 and the head 118 so as to bias the connective member 18 towards the second, nonengaged position $C_2$ (FIG. 12), such the handle hub 104 is unconnected with the spindle 44B.

Further, the connective mechanism actuator 20 preferably includes a displaceable cam member or cam 122 engageable with the connective member 18, a motor driver 121 (FIG. 3), an electric motor 124, and a spring shaft 126 configured to connect the motor 124 with the cam 122. The cam 122 includes a first, generally rectangular base portion 123 slidably disposed on a rail wall 85*a* of the base plate 76 and a second, arm portion 125 attached to the base portion 123 and extending generally transversely with respect the handle axis 6*a*. The base portion 123 has at least one opening 123*a* configured to receive a connector pin 127 attached to the spring shaft 126 so as to connect the cam 122 with the shaft 126. The engagement arm portion 125 has an arcuate wall section 125*a* providing a generally concave contact surface 125*b* that extends partially circumferentially about the axis 6*a* and is contactable with the connective member head 118. Further, the electric motor 124 includes a rotatable shaft 124*a* attached to the spring shaft 126 and is mounted within a U-shaped bracket wall 85*b* of the base 76. Furthermore, the motor driver 121 is electrically connected with the microprocessor 17 (see FIG. 3) and is configured to operate the motor 124 such that the motor shaft 124*a* is selectively rotatable in opposing directions in response to an appropriate control signal $S_C$, as discussed above and in further detail below. Preferably, the actuator 20 further includes a coil spring 128 extending between the cam arm portion 125 and a U-shaped retainer wall 85*c* of the base 76 and configured to bias the cam 122 generally toward the handle axis 6*a*.

With the above structure, when the lock controller 16 determines that the exterior handle 6 should be connected with the latch 4, the controller 16 sends a control signal $S_C$ to the motor driver 121 so that the motor shaft 124*a* rotates in one rotational direction, such that the cam 122 displaces in a first linear direction $L_1$ toward the handle axis 6*a*. Such movement of the cam 122 causes the arm portion 125 to push against the connective member 18 (against the biasing action of the spring 120) so that the member inner end 116*a* enters the hub engagement opening 103 (FIG. 9), thereby releasably connecting the hub 104 with the exterior spindle 44B and thus the exterior handle 6 with the latch 4. When the connective member 18 is connected with the hub 104, rotation of the handle 6 causes the connective member head 118 to slide against the cam arcuate surface 125*b*, so that the connective member inner end 116*a* remains disposed within the hub opening 103 during the entire displacement of the handle 6.

When the controller 16 has connected the handle 6 in response to either an unlock input $I_U$ or master input $I_M$, the controller 16 sends another control signal $S_C$ to the motor driver 121 after a predetermined interval of time (e.g., 5 seconds), such that the motor shaft 124*a* rotates in an opposing rotational direction. The cam 122 then displaces in a second linear direction $L_2$ away from the handle axis 6*a*, moving the arm portion 125 away from the connective member 18 and enabling the spring 120 to bias the connective member 18 toward the second position $C_2$ (FIG. 12). As such, the connective member inner end 116*a* disengages from the hub opening 103 so that the hub 104 is disconnected with the exterior spindle 44B, thus decoupling the exterior handle 6 from the latch 4. However, when the controller 16 has connected the handle 6 in response to a toggle input $I_T$, the controller 16 does not send another signal to the motor driver 121, such that the exterior handle 6 remains operatively connected with the latch 4 until it is desired to disconnect the handle 6 (i.e., by another toggle input $I_T$) or until the controller lockdown mode $M_L$ is initiated.

Furthermore, the exterior control assembly 11B also preferably includes a cylinder lock 130 with a pusher arm 131 configured to displace the cam 122 in the opposing linear directions $L_1$ and $L_2$, so as thereby connect or disconnect the exterior handle 6 with the latch 4. As such, the cylinder lock

130 functions as a "back-up" actuator for use in the event of a failure of any components of the lock controller 16 or of the connective mechanism 13. In addition, the cylinder lock 130 also provides a means of overriding the controller 16 to permit entry from the door exterior side 2*b* when the controller 16 is in the lockdown mode $M_L$. Furthermore, a control switch 129 is attached to a base wall mounting plate 85*d* and is electrically connected with the lock controller 16 and contactable by the pusher arm 131. As such, when the cylinder lock 130 is used to operate the connective mechanism 13, the switch 129 sends a signal to the controller 16 to provide an "event record" of the operation of the lock 1.

Referring now to FIGS. 8 and 9, as discussed above, each of the input devices 14A, 14B is preferably constructed as a card reader input device 26 that includes a card reader 27 and an input controller 28, with each controller 28 preferably being incorporated into the microprocessor 17. Each card reader 27 is preferably a contactless proximity card reader that includes an antenna 132, which is preferably a generally annular magnetic coil 133 with an opening 133*aa* sized to receive a card 15, and a card reader controller 134 (FIG. 8). Preferably, the two input device 14A, 14B share a single reader controller 134 located on a PC board 136 disposed within the interior control assembly 11A, but each may alternatively be provided with a separate controller 134. The antenna coil 133 generates a magnetic field such that when a card 15 is inserted into the opening 133*a*, changes to the field are sensed by the card controller 134. The reader controller 134 then increases the current flow through the coil 133, which causes the card 15 to be "powered" by induction. The powered card 15 then transmits a wireless signal containing user input $I_U$, $I_M$, $I_T$ or $I_L$ to the coil 133, which is transferred to the reader controller 134. The reader controller 134 then transforms the input signal $I_U$, $I_M$, $I_T$ or $I_L$ into a form recognizable by the microprocessor 17. Most preferably, each proximity card reader 27 is an eProx™ Lock Module 4041A commercially available from HID Corporation of Irvine, Calif., USA. However, the preferred card reader 27 may alternatively be provided by any other proximity or other contactless reader, or even a "contact" type card reader. In addition, as discussed above, the input devices 14A, 14B may be provided by any other device capable of providing an input to the lock controller 16, such as for example a keypad, a fingerprint or retinal scanner, etc.

Referring to FIG. 8, the lock controller 16 is preferably provided by the microprocessor 17 configured to provide the functions of both the lock controller 16 and the input controller 28 as described in detail above. Preferably, the microprocessor 17 is disposed on a PC board 140 disposed within the interior assembly housing 34 and is electrically connected with the connective mechanism 13 through the motor driver 121 (FIG. 9) as discussed above. The lockdown-input device 22 further includes a contact switch 142 disposed on the PC board 140 and electrically connected with the microprocessor 17. The input button 23 is contactable with the switch 142 such that when a user pushes the button 23, the button 23 causes the switch 142 to close and generates the lockdown signal $S_{LL}$ and transmits the signal $S_{LL}$ to the microprocessor 17. Furthermore, a power supply 25 is preferably provided by a battery pack 146 that is disposed within the interior assembly housing 34 and is attached to the base plate 60 by means of an adhesive pad 148. The power supply 25 is electrically connected with the microprocessor 17, the card reader controller 134, and with the connective mechanism motor 124 so as to provide power to each such component.

As discussed above, although the lock control system 10 preferably includes a connective mechanism 13 for releasably connecting and disconnecting the exterior handle 6 with the latch 4, the control system 10 may alternatively be provided with the retainer mechanism 19 for releasably retaining either the exterior handle 6, the latch 4 or a component (e.g., a part of the retractor 42) operatively connecting the handle 6 with the latch 4. Preferably, the retainer mechanism 19 is a handle lock mechanism 200 configured to releasably lock and unlock the exterior handle 6 so as to prevent and alternatively permit rotation of the handle 6 about the handle axis 6*a*. In other words, the exterior handle 6 may be constructed so as to be generally fixedly connected with the latch 4 (i.e., through the spindle 44B, retractor 42, etc.) and the retainer mechanism 19 may be constructed with one or more members (e.g., pin, lug, etc.) that engage with a portion of the handle 6 (or the exterior spindle 44B or other lock component connected with the exterior handle 6) to prevent handle rotation and alternatively disengages from the handle portion to enable handle rotation. With such a handle lock mechanism 200, the other components of the lock control system 10 may be constructed generally as described above, except with the lock controller 16 being configured to operate the lock mechanism 200 to unlock the exterior handle 6 under the operating conditions when the controller 16 connects the handle 6 with the latch 4 as described above (e.g., when receiving an unlock signal $S_U$ in the standard operating mode) and to lock the exterior handle 6 under conditions when the controller 16 disconnects the handle 6 with the latch 4 (e.g., in response to a toggle signal $S_T$ when the handle 6 was previously unlocked).

Most preferably, such a handle lock mechanism 200 includes a moveable locking member 201 displaceable between first and second positions and an actuator 202 operably coupled with the controller 16 and operatively connected with the locking member 201. In the first position (as depicted), the locking member 201 is engaged with the exterior handle 6, the latch 4, etc., so as to prevent displacement of the handle 6 or/and the latch 4 with respect to door 2, so as to prevent disengagement of the latch 4 from the frame 3. In the second position (not shown), the member 200 is nonengaged with the handle 6, latch 4, etc. so as to permit disengagement of the latch 4 from the frame 3. In the exemplary embodiment shown in FIG. 14, the moveable locking member 201 may include a lug 204 engageable with a notched opening 205 of a retainer plate 206 attached to a spindle 208 of the exterior handle 6. The locking lug 204 is preferably biased toward the first, engaged position (as depicted) by a biasing member, such as a spring 207. Further, the actuator 202 may include a solenoid 210 connected with the lug 204 and configured to linearly displace the lug 204 along an axis 212 to disengage the lug 204 from the retainer plate 206.

With this structure, when the lug 204 is engaged with the plate 206, the exterior handle 6 is prevented from rotating and is thus incapable of retracting the latch 4. However, when the controller 16 sends a control signal $S_C$ to the preferred solenoid 210, the solenoid 210 displaces the lug 204 out of engagement with the plate 206, such that the handle 6 is rotatable about the axis 6*a* to retract the latch 4. It must be noted that the handle locking mechanism 200 discussed above and depicted in FIG. 14 is provided for purposes of illustrating the scope of the present invention and the lock system 10 of the present invention encompasses any other appropriate structure of the retainer mechanism 19 that functions generally as described herein.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined herein and by the appended claims.

We claim:

1. A control system for a lock of a door movably disposed within a frame, the lock having a latch engageable with the frame to releasably secure the door to the frame, the door having an interior handle operatively connected with the latch and an exterior handle operatively connectable with the latch, the control system comprising:

a connective mechanism configured to releasably connect the exterior handle with the latch;

an input device configured to generate an unlock signal;

a controller coupled with the input device and configured to operate the connective mechanism such that the mechanism connects the exterior handle with the latch, the controller being selectively operable in a first, standard mode in which the controller operates the mechanism when the controller receives the unlock signal and a second, lockdown mode in which the controller does not operate the mechanism when the controller receives the unlock signal; and a lockdown-input device coupled with the controller and configured to generate a lockdown signal, the controller being configured to switch from the standard mode to the lockdown mode when the controller has received the lockdown signal from the lockdown device, wherein the controller is configured to switch from the lockdown mode to the standard mode when the door is displaced with respect to the frame, and wherein the input device is further configured to generate a master unlock signal when the input device receives a predetermined master-user input and the controller is configured to operate the connective mechanism such that the mechanism connects the exterior handle with the latch when the controller receives the master unlock signal when in the lockdown mode and receipt of the lockdown signal within a predetermined time interval subsequent to displacement of the door after the controller has received the master unlock signal in the lockdown mode causes the controller to remain in the lockdown mode.

2. The control system as recited in claim 1 wherein:

the input device is configured to generate at least one input signal when the input device receives a predetermined input, the unlock signal being one of the at least one input signal; and the controller is configured to switch from the standard mode to the lockdown mode when the controller has received both the lockdown signal from the lockdown-input device and one input signal from the input device.

3. The control system as recited in claim 2 wherein the input device is configured to generate the unlock signal when the input device receives one of a plurality of predetermined inputs.

4. The control system as recited in claim 2 wherein the controller is configured to switch from the standard mode to the lockdown mode when the controller has received the lockdown signal within a predetermined interval of time after the controller has received one input signal from the input device.

5. The control system as recited in claim 1 wherein the door has an interior side and an exterior side and the lockdown-input device is disposed generally on the interior side of the door.

6. The control system as recited in claim 1 wherein the lockdown-input device includes a pushbutton and is configured to generate the lockdown signal when the pushbutton is pushed by a user.

7. The control system as recited in claim 1 wherein the input device is further configured to generate a lockdown-cancel input signal and the controller is configured to switch from the lockdown mode to the standard mode when the controller has received the lockdown-cancel signal.

8. The control system as recited in claim 1 wherein the controller is further configured to operate the connective mechanism to disconnect the exterior handle from the latch upon expiration of a predetermined time interval after the exterior handle has been connected with the latch.

9. The control system as recited in claim 1 wherein the connective mechanism is further configured to automatically disconnect the exterior handle from the latch upon expiration of a predetermined time interval after the exterior handle has been connected with the latch.

10. The control system as recited in claim 1 wherein the input device is further configured to generate a lockdown signal when the input device receives a predetermined lockdown input, the controller being configured to switch from the standard mode to the lockdown mode when the controller receives the lockdown signal from the input device.

11. The control system as recited in claim 1 wherein the input device is further configured to generate a lockdown-cancel signal when the input device receives a predetermined lockdown cancel input, the controller being configured to switch from the lockdown mode to the standard mode when the controller receives the lockdown-cancel signal from the input device.

12. A control system for a lock of a door movably disposed within a frame, the lock having a latch engageable with the frame to releasably secure the door to the frame, the door having an interior handle operatively connected with the latch and an exterior handle operatively connectable with the latch, the control system comprising:

a connective mechanism configured to releasably connect the exterior handle with the latch;

an input device configured to generate an unlock signal;

a controller coupled with the input device and configured to operate the connective mechanism such that the mechanism connects the exterior handle with the latch, the controller being selectively operable in a first, standard mode in which the controller operates the mechanism when the controller receives the unlock signal and a second, lockdown mode in which the controller does not operate the mechanism when the controller receives the unlock signal;

a lockdown-input device coupled with the controller and configured to generate a lockdown signal, the controller being configured to switch from the standard mode to the lockdown mode when the controller has received the lockdown signal from the lockdown device;

wherein the controller is configured to switch from the lockdown mode to the standard mode when the door is displaced with respect to the frame, and wherein the input device is further configured to generate a lockdown unlock signal when the input device receives a predetermined lockdown-user input and another predetermined user input and the controller is configured to operate the connective mechanism such that the mechanism connects the exterior handle with the latch when the controller receives the lockdown unlock signal when in the lockdown mode and receipt of the lockdown signal within a predetermined time interval subsequent to displacement of the door after the controller has received the lockdown unlock signal in the lockdown mode causes the controller to remain in the lockdown mode.

13. The control system as recited in claim 1 further comprising a switch electrically coupled with the controller and configured to sense displacement of the door with respect to the frame.

14. The control system as recited in claim 1 wherein:

the input device is configured to generate the unlock signal when the input device receives a predetermined user input and to alternatively generate a master unlock signal when the input device receives a predetermined master-user input; and the controller is configured to operate the connective mechanism such that the mechanism connects the exterior handle with the latch when the controller receives the master unlock signal while in the standard mode and alternatively when the controller receives the master unlock signal while in the lockdown mode.

15. The control system as recited in claim 1 wherein the input device is configured to generate the master unlock signal when the input device receives one of a plurality of predetermined master-user inputs.

16. The control system as recited in claim 1 wherein:

the input device is further configured to generate a lockdown unlock signal when the input device receives a predetermined lockdown-user input and another predetermined user input; and the controller is configured to operate the connective mechanism such that the mechanism connects the exterior handle with the latch when the controller receives the lockdown unlock signal when in the lockdown mode.

17. A control system for a lock of a door movably disposed within a frame, the lock having a latch engageable with the frame to releasably secure the door to the frame, the door having an interior handle operatively connected with the latch and an exterior handle operatively connectable with the latch, the control system comprising:

a connective mechanism configured to releasably connect the exterior handle with the latch;

an input device configured to generate an unlock signal; and a controller coupled with the input device and configured to operate the connective mechanism such that the mechanism connects the exterior handle with the latch, the controller being selectively operable in a first, standard mode in which the controller operates the mechanism when the controller receives the unlock signal and a second, lockdown mode in which the controller does not operate the mechanism when the controller receives the unlock signal, wherein the connective mechanism is adjustable between a first configuration in which the exterior handle is operatively connected with the latch and second configuration in which the exterior handle is unconnected with the latch;

the input device is further configured to generate a toggle signal when the input device receives a predetermined toggle input;

the controller is further configured to operate the connective mechanism when the controller receives the toggle signal while in the standard mode such that the connective mechanism is adjusted to the second configuration when arranged in the first configuration and is alternatively adjusted to the first configuration when arranged in the second configuration, the controller being further configured such that the controller does not operate the connective mechanism when the controller receives the toggle signal while in the lockdown mode.

18. The control device as recited in claim 17 wherein:

the connective mechanism includes a connective member displaceable between a first position in which the exterior handle is operatively connected with the latch and a second position in which the exterior handle is unconnected with the latch.

19. The control system as recited in claim 1 wherein the connective mechanism includes a connective member displaceable between a first position at which the exterior handle is operatively connected with the latch and a second position at which the exterior handle is unconnected with the latch.

20. The control system as recited in claim 19 wherein the connective mechanism further includes an actuator operably coupled with the controller and configured to displace the connective member between the first and second positions.

21. The control system as recited in claim 1 wherein the exterior handle includes an inner portion engageable by the connective mechanism and an outer portion manipulable by a user, such that when the connective mechanism connects the exterior handle with the latch, displacement of the handle outer portion displaces the latch between a first position at which the latch is engaged with the frame and a second position at which the latch is nonengaged with the frame.

22. The control system as recited in claim 21 wherein the handle outer portion is one of rotatably displaceable with respect to the door and linearly displaceable with respect to the door.

23. The control system as recited in claim 1 wherein:

the lock includes a retractor, the retractor being configured to displace the latch between a first position in which the latch is engaged with the frame and a second position in which the latch is disengaged from the frame, and a spindle connected with the retractor; and the connective mechanism includes a connective member, the connective member being coupled with the spindle and engageable the exterior handle, and a cam member configured to displace the connective member between a first position in which the connective member is engaged with the exterior handle and a second position in which the connective member is nonengaged with the exterior handle.

24. The control system as recited in claim 23 wherein the connective mechanism further includes an actuator operatively coupled with the controller and configured to displace the cam member in a first direction such that the connective member displaces generally from the second position toward the first position and to alternatively displace the cam member in a second direction such that the connective member displaces generally from the first position and toward the second position.

25. The control system as recited in claim 1 wherein:

the input device is an exterior input device disposed generally on the exterior side of the door; and the control system further comprises an interior input device disposed generally on the interior side of the door and configured to generate an unlock signal.

26. The control system as recited in claim 1 wherein the input device includes at least one of a magnetic card reader and a keypad.

27. The control system as recited in claim 1 further comprising an indicator configured to display an indication when the controller is in the standard mode and to display another indication when the controller is in the lockdown mode.

28. The control system as recited in claim 1 wherein the door has an interior side and an exterior side and further comprising a first indicator disposed generally on the door exterior side and a second indicator disposed generally on the door interior side, each one of the first and second indicators being configured to display an indication when the controller is in the standard mode and to display another indication when the controller is in the lockdown mode.

29. The control system as recited in claim 1 further comprising a first indicator configured to display an indication when the controller is in the standard mode and a second indicator configured to display an indication when the controller is in the lockdown mode.

30. The control system as recited in claim 1 wherein the exterior and interior handles each include one of rotatable lever, a rotatable knob and a linearly displaceable push bar.

31. A control system for a lock of a door movably disposed within a frame, the lock having a latch, the latch being movably disposed within the door and engageable with the frame to releasably secure the door to the frame, and at least one handle operatively connectable with the latch to displace the latch with respect to the door, the control system comprising:

a mechanism configured to one of releasably connect the handle with the latch to permit disengagement of the latch from the frame and releasably retain at least one of the handle and the latch so as to prevent disengagement of the latch from the frame;

an input device configured to generate an unlock signal;

a controller coupled with the input device and configured to operate the mechanism, the controller being selectively operable in a first, standard mode in which the controller operates the mechanism when the controller receives the unlock signal so as to permit the latch to be disengaged from the frame and a second, lockdown mode in which the controller does not operate the mechanism when the controller receives the unlock signal; and a lockdown-input device coupled with the controller and configured to generate a lockdown signal, the controller being configured to switch from the standard mode to the lockdown mode when the controller has received the lockdown signal from the lockdown device, wherein the controller is configured to switch from the lockdown mode to the standard mode when the door is displaced with respect to the frame, and wherein the input device is further configured to generate a master unlock signal when the input device receives a predetermined master-user input and the controller is configured to operate the connective mechanism such that the mechanism connects the exterior handle with the latch when the controller receives the master unlock signal when in the lockdown mode and receipt of the lockdown signal within a predetermined time interval subsequent to displacement of the door after the controller has received the master unlock signal in the lockdown mode causes the controller to remain in the lockdown mode.

32. The control system as recited in claim 31 wherein the mechanism is a lock mechanism including:

a locking member displaceable between a first position at which the member is engaged with one of the handle and the latch so as to prevent displacement of the one of the handle and the latch with respect to door and a second position at which the member is nonengaged with the one of the handle and the latch; and an actuator operably coupled with the controller and configured to displace the locking member between the first and second positions.

33. The control system as recited in claim 31 wherein the mechanism is a connective mechanism including:

a connective member displaceable between a first position at which the exterior handle is operatively connected with the latch and a second position at which the exterior handle is unconnected with the latch; and an actuator operably coupled with the controller and configured to displace the connective member between the first and second positions.

34. A control system for a lock of a door movably disposed within a frame, the lock having a latch engageable with the frame to releasably secure the door to the frame, the door having an interior handle operatively connected with the latch and an exterior handle operatively connectable with the latch, the control system comprising:

a mechanism configured to one of releasably connect the exterior handle with the latch and to releasably lock the exterior handle so as to prevent movement of the exterior handle with respect to the door;

an input device configured to generate an unlock signal;

a controller coupled with the input device and configured to operate the connective mechanism such that the mechanism connects the exterior handle with the latch, the controller being selectively operable in a first, standard mode in which the controller operates the mechanism when the controller receives the unlock signal and a second, lockdown mode in which the controller does not operate the mechanism when the controller receives the unlock signal; and a lockdown-input device coupled with the controller and configured to generate a lockdown signal, the controller being configured to switch from the standard mode to the lockdown mode when the controller has received the lockdown signal from the lockdown device, wherein the controller is configured to switch from the lockdown mode to the standard mode when the door is displaced with respect to the frame, and wherein the input device is further configured to generate a master unlock signal when the input device receives a predetermined master-user input and the controller is configured to operate the connective mechanism such that the mechanism connects the exterior handle with the latch when the controller receives the master unlock signal when in the lockdown mode and receipt of the lockdown signal within a predetermined time interval subsequent to displacement of the door after the controller has received the master unlock signal in the lockdown mode causes the controller to remain in the lockdown mode.

35. A control system for a lock of a door movably disposed within a frame, the lock having a latch engageable with the frame to releasably secure the door to the frame, the door having an interior handle operatively connected with the latch and an exterior handle operatively connectable with the latch, the control system comprising:

a mechanism configured to one of releasably connect the exterior handle with the latch and to releasably lock the exterior handle so as to prevent movement of the exterior handle with respect to the door;

an input device configured to generate an input signal;

a controller coupled with the input device and configured to compare the signal to at least one stored signal value, the controller being further configured to operate the connective mechanism such that the mechanism connects the exterior handle with the latch and selectively operable in a first, standard mode in which the controller operates the mechanism when the controller input signal matches the stored signal value and a second, lockdown mode in which the controller does not operate the mechanism when the input signal matches the stored signal value; and a lockdown-input device coupled with the controller and configured to generate a lockdown signal, the controller being configured to switch from the standard mode to the lockdown mode when the controller has received the lockdown signal from the lockdown device, wherein the controller is configured to switch from the lockdown mode to the standard mode when the door is displaced with respect to the frame, and wherein the input device is further configured to generate a master unlock signal when the input device receives a predetermined master-user input and the controller is configured to operate the connective mechanism such that the mechanism connects the exterior handle with the latch when the controller receives the master unlock signal when in the lockdown mode and receipt of the lockdown signal within a predetermined time interval subsequent to displacement of the door after the controller has received the master unlock signal in the lockdown mode causes the controller to remain in the lockdown mode.

36. A control system for a lock of a door movably disposed within a frame, the lock having a latch engageable with the frame to releasably secure the door to the frame, the door having an exterior handle operatively connectable with the latch, the control system comprising:

a connective mechanism configured to releasably connect the exterior handle with the latch;

an input device configured to generate an input;

a controller coupled with the input device, configured to compare the input to at least one predetermined input value stored in the controller, and further configured to operate the connective mechanism such that the mechanism connects the exterior handle with the latch, the controller being selectively operable in a first, standard mode in which the controller operates the mechanism when the input corresponds to the at least one predetermined input value and a second, lockdown mode in which the controller does not operate the mechanism when the input corresponds to the at least one predetermined input value; and a lockdown-input device coupled with the controller and configured to generate a lockdown signal, the controller being configured to switch from the standard mode to the lockdown mode when the controller has received the lockdown signal from the lockdown device, wherein the controller is configured to switch from the lockdown mode to the standard mode when the door is displaced with respect to the frame, and wherein the input device is further configured to generate a master unlock signal when the input device receives a predetermined master-user input and the controller is configured to operate the connective mechanism such that the mechanism connects the exterior handle with the latch when the controller receives the master unlock signal when in the lockdown mode and receipt of the lockdown signal within a predetermined time interval subsequent to displacement of the door after the controller has received the master unlock signal in the lockdown mode causes the controller to remain in the lockdown mode.

* * * * *